(12) United States Patent  (10) Patent No.: US 7,684,338 B2
Grieswald  (45) Date of Patent: Mar. 23, 2010

(54) CIRCUIT ARRANGEMENT FOR TESTING A COMMUNICATION SYSTEM

(75) Inventor: Jens Grieswald, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 1043 days.

(21) Appl. No.: 09/997,034

(22) Filed: Nov. 28, 2001

(65) Prior Publication Data

US 2002/0067743 A1  Jun. 6, 2002

(30) Foreign Application Priority Data

Dec. 6, 2000 (EP) .................................. 00126787

(51) Int. Cl.
*H04L 1/00* (2006.01)
(52) U.S. Cl. ..................... 370/247; 370/251; 370/469; 709/227; 709/230; 714/25; 714/43; 703/13; 703/23
(58) Field of Classification Search ................. 370/235, 370/241, 242, 243, 244, 245, 246, 250, 466, 370/467, 469; 714/30, 31, 32, 33, 39; 709/224
See application file for complete search history.

(56) References Cited

U.S. PATENT DOCUMENTS

| | | | |
|---|---|---|---|
| 5,027,343 A | | 6/1991 | Chan et al. |
| 5,579,476 A | * | 11/1996 | Cheng et al. .................. 714/32 |
| 5,732,213 A | * | 3/1998 | Gessel et al. ................. 709/224 |
| 5,774,695 A | * | 6/1998 | Autrey et al. .................. 703/26 |
| 5,822,520 A | * | 10/1998 | Parker ......................... 709/230 |
| 5,878,030 A | | 3/1999 | Norris |
| 6,327,637 B1 | * | 12/2001 | Chang ......................... 710/305 |
| 6,381,721 B1 | * | 4/2002 | Warren ........................ 714/727 |
| 6,751,761 B1 | * | 6/2004 | Tendo .......................... 714/716 |
| 6,823,479 B1 | * | 11/2004 | McElhaney et al. ........... 714/43 |
| 6,973,043 B1 | * | 12/2005 | Farooq ......................... 370/250 |

(Continued)

FOREIGN PATENT DOCUMENTS

EP  0788267  8/1997

(Continued)

*Primary Examiner*—Chi H. Pham
*Assistant Examiner*—Shick Hom
(74) *Attorney, Agent, or Firm*—Francis I. Gray; Michael J. Fogarty, III; Matthew D. Rabdau

(57) ABSTRACT

The present invention relates to a circuit arrangement with which a communication that is subdivided into functional layers is processable by a first layer for a higher layer and/or by a higher layer for the first layer, the first layer being formed by a physical layer and the circuit arrangement featuring at least one port which allows a communication directly with a layer that is higher than the first layer without the communication previously having to pass through the first layer. It also relates to a method for testing a switch for a telecommunication network, according to which the switch with a circuit arrangement is first made available, with which a communication that is subdivided into functional layers is processable by a first layer for a higher layer and/or by a higher layer for the first layer, the first layer being formed by a physical layer and the circuit arrangement featuring at least one port which allows a communication directly with a layer that is higher than the first layer without the communication previously having to pass through the first layer, with data thereafter being output from at least one port which are output in a further step.

10 Claims, 3 Drawing Sheets

U.S. PATENT DOCUMENTS

| | | | |
|---|---|---|---|
| 7,042,880 B1 * | 5/2006 | Voit et al. | 370/395.1 |
| 7,340,166 B1 * | 3/2008 | Sylvester et al. | 398/45 |
| 2004/0042407 A1 * | 3/2004 | Karacelik et al. | 370/241 |
| 2004/0243710 A1 * | 12/2004 | Mao | 709/227 |

FOREIGN PATENT DOCUMENTS

| | | |
|---|---|---|
| GB | 2203617 | 10/1988 |
| WO | WO 97/35406 | 9/1997 |

\* cited by examiner

CIRCUIT ARRANGEMENT FOR TESTING A COMMUNICATION SYSTEM

BACKGROUND OF THE INVENTION

The present invention relates to the area of open communication system testing, and more particularly to a circuit arrangement for processing a communication, i.e. a circuit arrangement with which a communication, which is subdivided into functional layers, is processable by a first layer for a higher layer and/or by a higher layer for the first layer, the first layer being formed by a physical layer.

Open communication systems must be understood as systems that are capable of communicating and cooperating with other systems. Cooperation here means communication between systems for the purpose of completing a joint task or of continually developing a joint initial understanding through the transfer of information.

Manufacturer-independent, flexible communication is accomplished by open systems complying with standardized procedures for information exchange, such as standardized rules and protocols, which determine system behaviour. Such protocols do not only define the internal structure of the open system but also its outward behaviour.

The architecture model for open communication systems was developed by ISO, the International Standardization Organization. The OSI (Open Systems Interconnection) reference model subdivides the necessary functions into a hierarchical layer structure. It has a major influence on the future design of data end systems and data networks. FIG. 1 shows the OSI communication model. Applications 10a, 10b of two end systems 12a, 12b are the real sources and sinks of the communication. One end system 12a, which has one or several applications, 10a communicates with another end system 12b. The communication may take place either directly via a transmission medium 14 or via a transit system 16 which may be a data network or a telephone network.

The OSI reference model is based on the following principles:
Layering of functions required for the communication
Service of the individual layers
Protocols for communication between layers of the same level The seven layers of the OSI reference model are shown in FIG. 2. The OSI reference model is a thought model in which the communication is subdivided into strictly task-related, functional layers, with layers 1 to 4 forming the so-called transport function and layers 5 to 7 describing application protocols.

In FIG. 2, elements corresponding to those of FIG. 1 have been given the same reference numbers. The figure also shows that the relevant end system is assigned to a use 18a, 18b.

The following is a description of the individual layers:

Layer 1: Bit transfer layer (physical layer):
The bit transfer layer provides unsecured transfer of binary signals on a transfer path. It comprises the following functions: parallel/serial conversion, adaptation to the physical properties of the transmission medium, synchronisation, interconnection of transfer sections, status monitoring, activation and deactivation of the transfer path.

Layer 2: Securing layer (data link layer):
From the unsecured transfer in layer 1 a secured transfer is achieved with the aid of the functions of layer 2. It includes the following functions: connection/disconnection of a layer 2 connection, transfer control, transfer error monitoring, subdivision of the data of layer 3 into blocks, block numbering, generation and evaluation of test bytes.

Layer 3: Switching layer (network layer):
This decides how a network connection between the end systems is set up. Functions: set-up and monitoring of network connections, connection control (path selection), network-dependent error monitoring, end system coupling.

Layer 4: Transport layer:
Layer 4 sets up, controls and terminates the transport connection leading from one end system to the other. It comprises the following functions: adaptation to different network properties, end-to-end error control, address translation (e.g. name to telephone number), data segmentation.

Layer 5: Communication control (session layer):
Layer 5 serves to start a communication, ensure its proper execution and its termination. It comprises the functions of connecting and maintaining logical connections, connection identification and dialogue control.

Layer 6: Presentation layer:
The presentation protocol decides how the information items are to be exchanged and presented in a common language. Layer 6 comprises the functions of syntax selection in line with the application, format adaptation, code and alphabet conversion.

Layer 7: Application layer:
In layer 7 the system and application control actions are carried out. It comprises the functions of identification of communication partners, authorisation check for communication, access to communication, selection of transfer quality and transfer parameters.

One layer in the reference model is represented by a so-called entity. The entity provides the functions assigned to it in the layer model. This way it provides a service for the next higher layer. One example is the service of layer 2 which securely transfers layer 3 information for layer 3. This service provisioning is not only used by the next higher layer but by all layers situated above it. A higher layer thus uses the sum of all layers situated below it. The entities of the layers communicate only with the respective neighbouring layers (towards the top and the bottom).

FIG. 3 shows the communication between the layers as an example for any three layers 20a, 20b, 20c. In order to be able to provide the service of a particular layer, the relevant entity communicates with the entity of the same layer in the peer system, its peer entity. The communication with the peer entity takes place through the exchange of messages. The prescribed exchange of such messages is called protocol. Each layer has such a layer protocol to be able to provide to the higher-level layers the service assigned to it in the reference model. The higher layers see nothing of this protocol. They are only presented with the result of the service provisioning. In this way, when the information items run through the individual layers, protocol data units are added by each layer to the actual information items to be transferred. On the other hand, when the information items run through from bottom to top, protocol data units are removed until, finally, the actual information items to be transferred remain. The layer protocol determines the outward behaviour of a system and is therefore generally standardized.

Each entity requests the assigned functions from the respective lower layers. All higher layers in the reference model are represented by a service access point located directly under it. The communication between the layers takes place via so-called service elements (communication primitives, or simply primitives—elementary messages that cannot be subdivided). The communication within a system is not normally standardized.

Open communication systems are checked using test apparatuses such as protocol testers. Said protocol testers have the task of testing the service quality of telecommunication connections by, on the one hand, monitoring communications actually taking place and making such communications the basis of an analysis, and on the other hand, by stimulating participants in the communication with test communications. In the first case, a distinction is made between two possibilities: firstly, the relevant information transmitted through the communication line is duplicated, see FIG. 4b, the duplicate being transferred to protocol tester 22. In a second possibility, see FIG. 4a, the protocol tester 22 is arranged serially in the communication path between two end systems 12a and 12b, i.e., the whole communication takes place across the protocol tester 22. With the method known from the prior art, see FIG. 4a and FIG. 4b, outputting of the communication to the protocol tester 22 takes place at a transit system 16.

FIG. 5 shows the interconnection of two end systems and one test apparatus 22 for the methods shown in FIGS. 4a and 4b and known from the prior art. In this drawing plane, the transit system 16 is situated behind the test apparatus 22 and is therefore not visible. With this prior art, the problem is that test apparatus 22 also has to have a physical interface in order to make available the information transported via the transmission medium, as indicated by lines 26a to g in FIG. 5. In case that only information of a low layer, such as layer 2 or layer 3, is important for an operator who accesses the test apparatus 22 via a port 23, further processing of the information by higher-level layers may be dispensed with, i.e., providing lines 26a, 26b is sufficient. Accordingly, only the processing of the information for the lower-level layers has to be realized in the test apparatus 22. What cannot be avoided, however, is the need for an interface for processing the information for layer 2, which means that the layer 1 functions have to be implemented in said interface. Particularly for high-speed connections, realizing a physical interface requires great technical effort and is thus costly.

What is desired is to avoid the disadvantages of the prior art and to provide a circuit arrangement and/or a method that allows a test apparatus to test a communication system with as little effort as possible.

BRIEF SUMMARY OF THE INVENTION

Accordingly a circuit arrangement features at least one port that allows a communication directly with a layer that is higher than the first layer, without the communication previously having to pass through the first layer. Also a method provides for testing a switch for a communication network, according to which a switch with a circuit arrangement is first provided, with which a communication subdivided into functional layers is processable by a first layer for a higher layer and/or by a higher layer for the first layer, the first layer being formed by a physical layer and the circuit arrangement featuring at least one port that allows a communication directly with a layer that is higher than the first layer without the communication previously having to pass through the first layer. Afterwards, data are output from the at least one port and finally the output data are analyzed. Switches within the meaning of the present invention are end systems and/or transit systems in which the communication, which is subdivided into functional layers, is processed by at least the first layer for a higher layer and/or by a higher layer for the first layer.

The objects, advantages and other novel features of the present invention are described in the detailed description below in conjunction with the appended claims and attached drawing.

DETAILED DESCRIPTION OF THE INVENTION

The present invention is based on the idea that in a switch, by definition, the data from a bit transfer layer, i.e., the physical layer, are processed towards higher layers. Now if this information of the desired layer is in any case already available in the switch, this information is output directly from the switch by providing a port on the associated circuit arrangement of the switch to which a test apparatus, particularly a protocol tester, may be connected. Particularly for high-speed networks connected to optical fibres, dispensing with the transition from optical to electrical signals constitutes a significant advantage. The protocol tester may be used not only for monitoring a connection, but also for feeding stimuli. For this reason, it may, inter alia, be used advantageously in logic analysis and for the emulation of functions (instead of an emulator used previously, which had to be furnished separately). On this basis it is thus possible to develop inexpensive test apparatuses which directly analyze the information made available by the switches, i.e., which do not have any processing hardware whatsoever.

Figure 1:
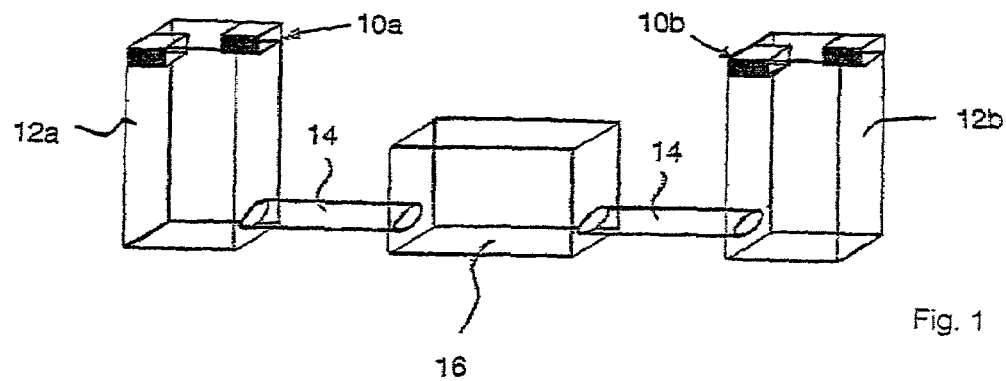
FIG. 1 is an illustrative view of the OSI communication model known from the prior art.
Figure 2:
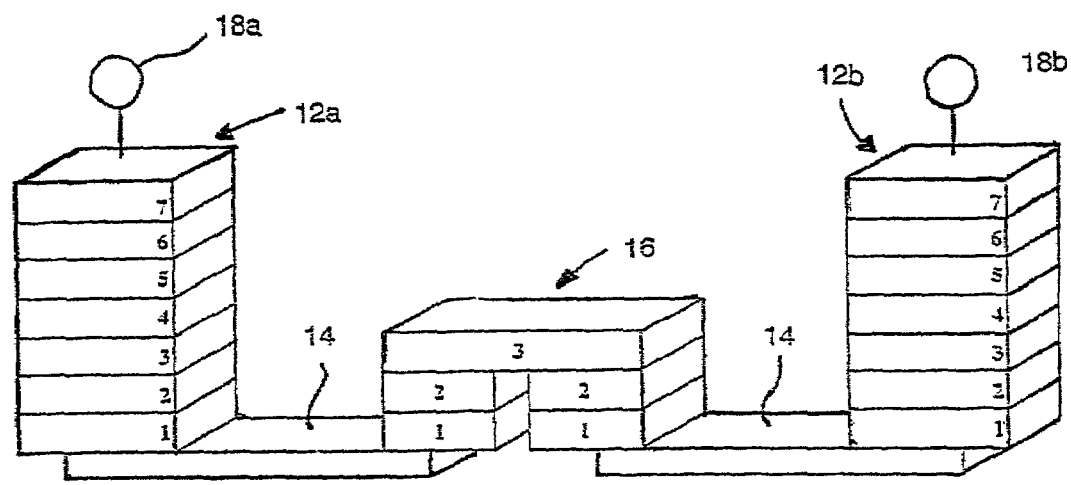
FIG. 2 is an overall drawing view of the OSI reference model.
Figure 3:
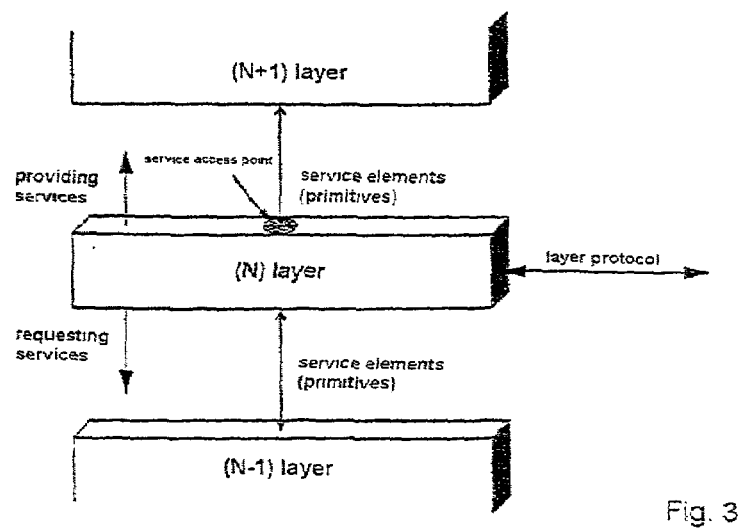
FIG. 3 is a principal drawing to explain the communication between the layers of the OSI reference model.
Figure 5:
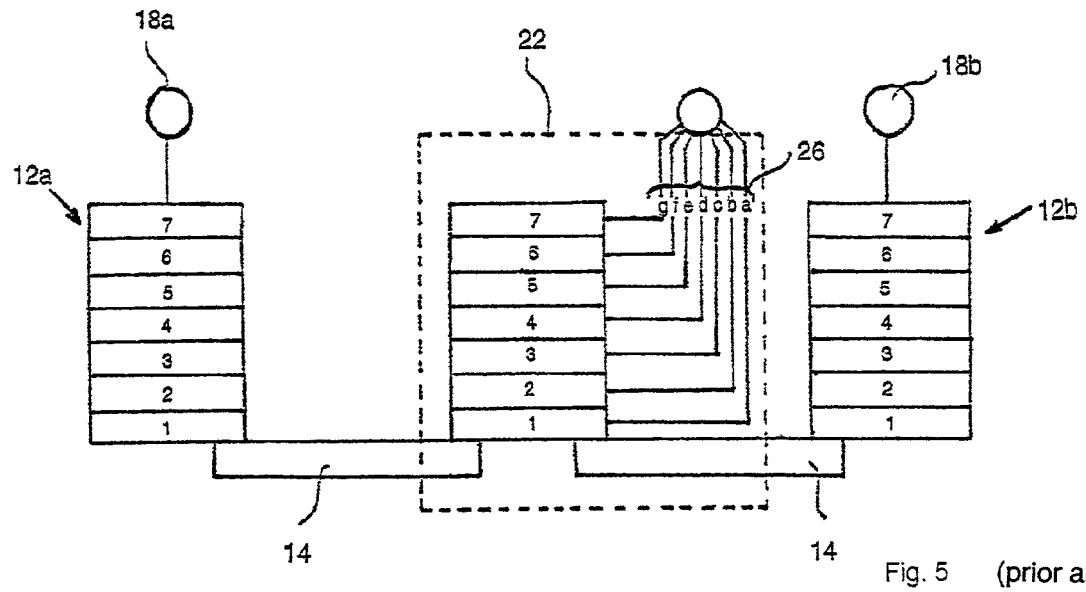
FIG. 5 is a detailed drawing of the arrangements of FIG. 4a and FIG. 4b.
Figure 4A:
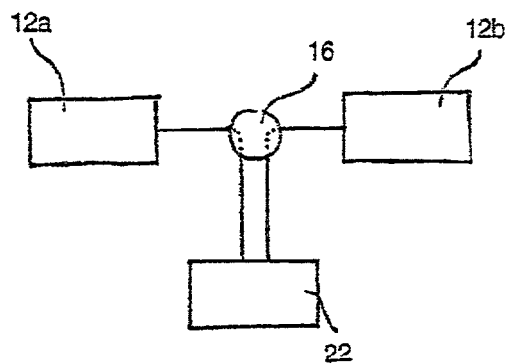
FIGS. 4a and 4b are illustrative views of two possibilities, known from the prior art, of arranging a test apparatus to test a communication.
Figure 4B:
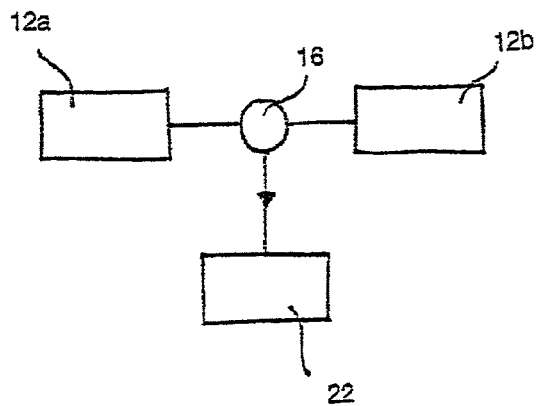

Another advantage results as follows: the so-called line interfaces known from the prior art have the problem that only 1:1 connections may be realized, i.e., at the input and/or output of the interface only the information intended for the relevant line and/or in the relevant port can be input and/or output. Contrary to this any other point in the system may be tested because information on the port of a circuit arrangement as described below is on the one hand pollable and on the other—and this is provided particularly with test signals in mind—also inputtable. The reason for this is that through a port directly on the circuit arrangement of a switch, connections to other lines which would not be accessible to a conventional test apparatus because they are not provided by any external protocol may be established in a simple way. This includes in particular the possibility of polling information not offered on the physical lines available to a test apparatus according to the prior art, see FIG. 4a, 4b such as the contents of memories, interim results, etc.

As already mentioned, the functional layers may correspond to the OSI reference model. However, what is described below is not limited to the testing of communication structured according to the OSI reference model.

Communication within the meaning of the present description may in particular involve the inputting of data into the at least one port, or the outputting of data from the at least one port. Outputting from the port of course includes the transfer of test communication within the circuit arrangement, i.e., within the switch, to the locations intended for this purpose.

Processing of the communication is preferably realized on a single chip, the port connecting to the chip being provided. Another preferred alternative consists in having communication processing realized on a first chip and the port on a second chip, the first and second chips being linked with each other for the purpose of data transfer. Here it is particularly important to bear in mind that a useful signal, for example, may be processed by a processor while a measurement signal may be processed in a co-processor assigned to the processor.

In the method described herein also the step of inputting data into the at least one port may occur between the provisioning of the switch and the outputting of data. Such input data may particularly include a stimulation signal. When the stimulation signal is input, the data output may include the response to the stimulation signal. Finally, it may also be envisaged for the output data to include a monitoring signal.

Figure 6:
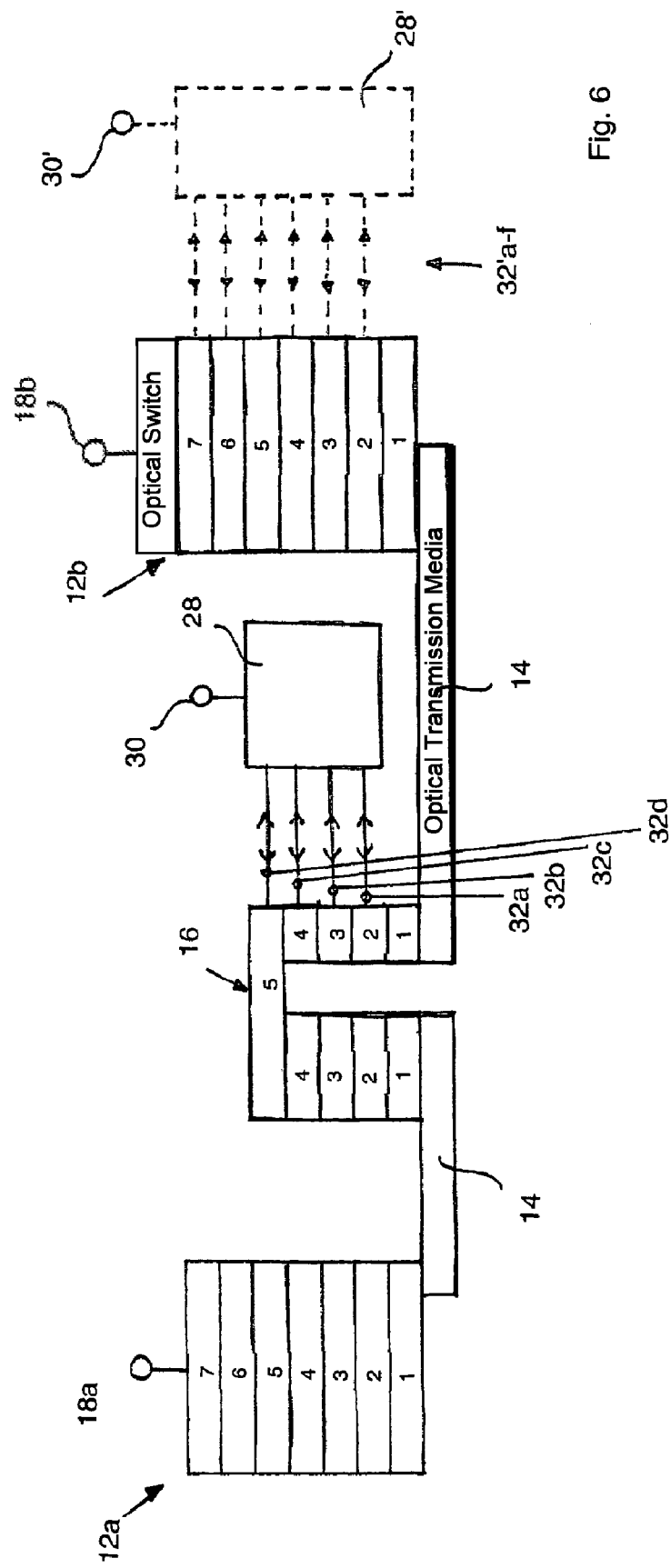
FIG. 6 is a block diagram view of an embodiment of a circuit arrangement according to the present invention.

In FIG. 6 elements corresponding to the preceding figures are marked with the same reference signal. FIG. 6 again shows two end systems 12a, 12b each of which can be operated by a user 18a, 18b. A transit system 16 links two transmission media 14. Within the meaning of the above definition, the end systems 12a and 12b and the intermediate system 16 can each be referred to as a switch.

The following initially describes one embodiment of the invention where the transit system 16 has a test apparatus 28 connected to it. Said test apparatus 28 may be operated by a user via a port 30. The transit system 16, which also features communication processing via functional layers, features several ports 32a to d, which allow a communication directly with a layer which is higher than the first layer, in the present example the second, third, fourth and fifth layer, without the communication previously having to pass through the first layer in the test apparatus 28. The individual ports 32a to 32d are connected to the test apparatus 28. The test apparatus 28 may output data through said ports 32a to 32d for monitoring a communication, but it may also input additional data, such as a stimulation signal, it then being possible for the output data to include a response to the stimulation signal. The ports 32a to 32d may of course be grouped in a single port on the transit system 16 in which case only one port also has to be provided on the test apparatus 28. It is not necessary to have the test apparatus 28 communicate with all layers that are higher than the first layer; it is rather sufficient to have the possibility of communicating with the layers of interest. For this reason, access to 1 to n−1 layers may be of interest for a switch processing n layers, depending on the application case.

As an example, FIG. 6 shows in dashed lines how a test apparatus 28' which may be operated by a user at port 30' may be connected to the end system 12b. Both the end system 18b and the transit system 16 include a circuit arrangement with which the communication is processed. For the transit system 16 processing of the communication is realized on a single chip, the ports 32a to 32d being provided on said chip. The end system 12b features a circuit arrangement for which processing of the communication is realized on a first chip, and the ports on a second chip, the first and second chips being linked with each other for data transfer. The first one may, for example, be a processor, while the second chip may be a co-processor working with said processor. The transmission medium 14 may be optical waves, such as for a high-speed network. The test apparatuses 28, 28' lack an interface to convert optical signals into electrical signals.

As is shown by way of the example of the transit system 16, the communication between the end systems 12a, 12b is on the one hand made available to the test apparatus 28 and on the other also passed on within the transit system to maintain the communication between the two end systems 12a, 12b. Instead of the test apparatus 28, 28' a measured value memory may also be provided, which only records data that in a further step may then be passed on to evaluation units.

What is claimed is:

1. A circuit for testing a communication system that is subdivided into functional layers comprising:
   a port that allows communication by a test apparatus directly with any layer that is higher than a first layer of the functional layers without the communication previously having to pass through the first layer, the first layer being a physical layer on an optical transmission medium, and data in the layer that is higher than the first layer comprising electrical signals; and
   two or more ports, each of the ports providing direct access to data from a separate layer that is higher than the first layer, the ports separate from connections to the optical transmission media, the two or more ports adapted for outputting data to a test apparatus and for receiving input stimulation data from the test apparatus.

2. The circuit arrangement according to claim 1 wherein the functional layers correspond to an OSI reference model.

3. The circuit arrangement according to claim 1 wherein processing of the communication is realized on a single chip, with the port being provided on the chip.

4. The circuit arrangement according to claim 1 wherein processing of the communication is realized on a first chip and the port is on a second chip, the first and second chips being linked with each other for data transfer.

5. A method for testing a switch for a telecommunication network that is subdivided into functional layers comprising the steps of:
   providing the switch with a circuit arrangement having ports that allow communication by a test apparatus directly with any layer that is higher than a first layer of the functional layers without the communication previously having to pass through the first layer, the first layer being a physical layer on an optical transmission medium, and data in the layer that is higher than the first layer comprising electrical signals;
   outputting response data from the port to the test apparatus; and
   analyzing the response data by the test apparatus.

6. The method according to claim 5 further comprising the step of inputting test data into the port before the outputting step.

7. The method according to one of claim 5 or 6 wherein the test data comprise a stimulation signal.

8. The method according to claim 7 wherein the response data comprise a response to the stimulation signal.

9. The method according to claim 5 wherein the response data comprise a monitoring signal.

10. An optical switch connected to optical transmission media, the switch comprising:
    a processor for processing data from a bit transfer layer to two or more higher-level protocol layers, the bit transfer layer being a physical layer on the optical transmission media, data in the two or more higher-level protocol layers being electrical signals; and two or more ports, each of the ports providing direct access to data from a separate one of the higher-level protocol layers, the ports separate from connections to the optical transmission media, the two or more ports adapted for outputting data to a test apparatus and for receiving input stimulation data from the test apparatus.

* * * * *